J. H. VAILE.
WATER SUPPLY SYSTEM.
APPLICATION FILED OCT. 21, 1918.
1,365,359.
Patented Jan. 11, 1921.
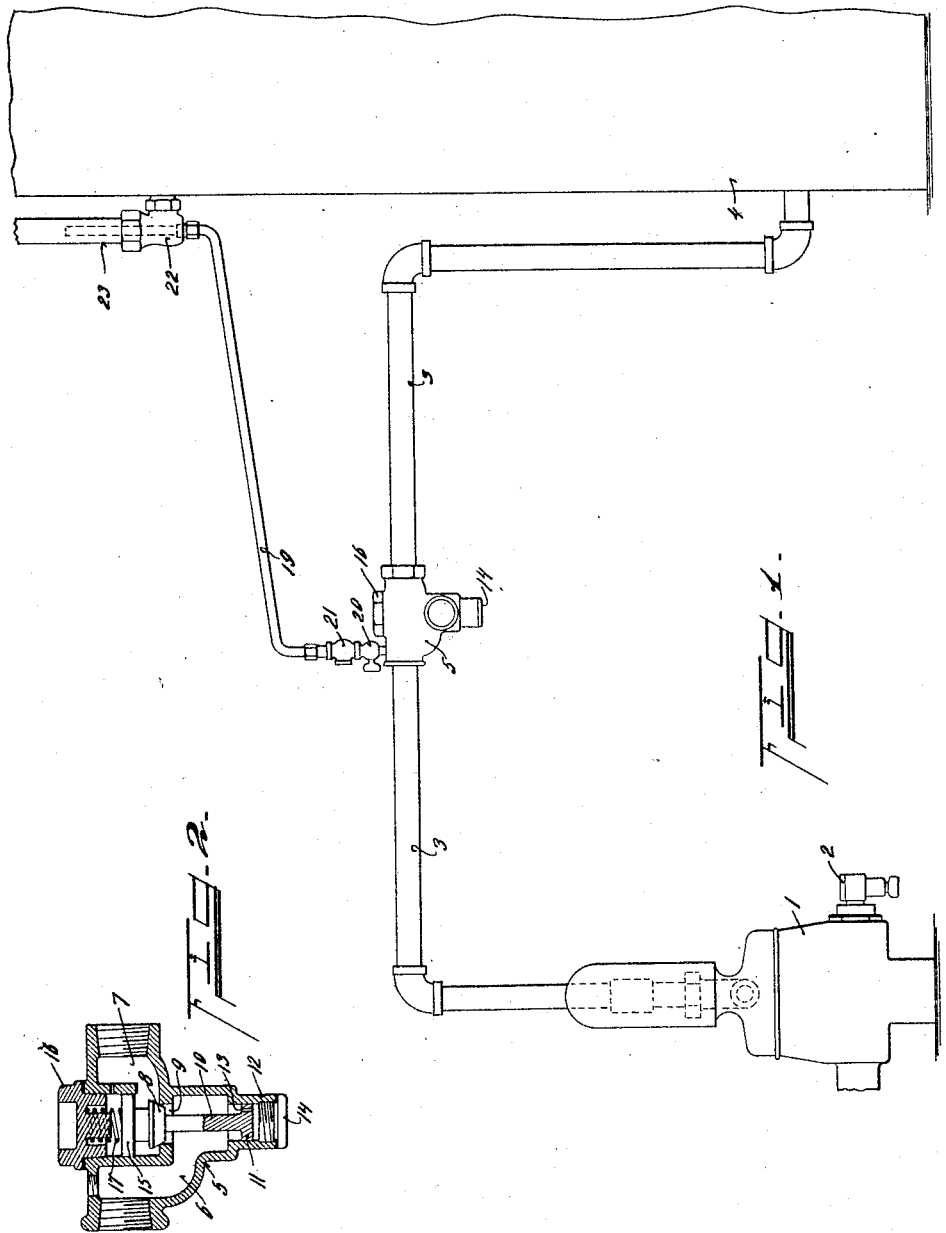
Inventor
J. Henry Vaile
By Wood & Wood.
Attorneys.

UNITED STATES PATENT OFFICE.

JOHN HENRY VAILE, OF DAYTON, OHIO, ASSIGNOR TO THE VAILE-KIMES COMPANY, OF DAYTON, OHIO, A CORPORATION OF OHIO.

WATER-SUPPLY SYSTEM.

1,365,359.  Specification of Letters Patent.  Patented Jan. 11, 1921.

Application filed October 21, 1918. Serial No. 259,054.

*To all whom it may concern:*

Be it known that I, JOHN HENRY VAILE, a citizen of the United States, and residing at Dayton, in the county of Montgomery and State of Ohio, have invented a new and useful Improvement in Water-Supply Systems, of which the following specification is a full disclosure.

The invention relates particularly to a domestic water service system wherein the water from a station supply source is pumped into a compression tank and discharged from the service outlet under the pressure maintained in the tank.

In such systems to maintain the water in the compression tank in a dynamic form, it is necessary to keep a head of air under pressure above the water in the tank, and the air supply must be replenished from time to time to prevent the tank from becoming water-logged. The air, under a prevailing practice, is supplied through the water pump, so that when the pump is in operation both air and water is delivered to the tank. To adapt the pump to serve said dual capacity, it is usually provided with a valve controlled air inlet port, so that the piston in one stroke on its suction side draws a quantity of air into the pump cylinder, and with an opposite stroke forces the air with the water into the tank. It however, has been experienced that the air will pocket in the pipe connecting the pump and tank, at a point or points in the pipe which are at a higher elevation than the inlet port of the tank, and as the air is compressible and elastic, it will be confined and accumulated at such points, forming an impediment in such connection, resulting in a reduction of the pipe capacity and the imparting of a counter-influence against the pump, destroying its efficiency and if permitted will destroy the utility of the system.

It is therefore an object of the invention to provide a supplemental connection between the pump and tank, tapping or connecting with the water main connecting the pump and tank, communicating with the main at any point above the tank inlet where the air is apt to pocket or accumulate, and thereby establish a direct constantly upward course into the tank for the air to escape from said main.

Another object is to provide a pipe connection between a water pump and compression tank as an ascending air passage for conveying any air delivered from the pump into the tank and having said pipe connected with the tank through the water level gage of the tank for observation purposes.

Other objects and features relate to details of construction and arrangement of parts all fully revealed in the following description of the accompanying drawings, forming a part of this specification, the drawings illustrating a preferred arrangement, with like characters of reference denoting corresponding parts throughout the several views, of which:

Figure 1 is a side elevation of a portion of water pump and compression tank connected by water and air conveying pipes to produce the results sought by the invention.

Fig. 2 is an enlarged central vertical section of the check valve interposed in the piping connecting the pump and tank.

Referring to the drawings, 1 indicates a pump which may be of any commercial type or design, but preferably possessing the features disclosed in Patent No. 1,166,224, dated Dec. 28, 1915, which provides for the escape of air from the pump cylinder into the discharge chamber, so as to prevent the pump from becoming air bound. An air inlet attachment or air intake valve 2 fixed to or forming a part of the head or cap at one end of the cylinder provides a valve controlled port for admitting air into the cylinder during a suction stroke of the piston and delivering the air with the water to the storage tank to prevent the system becoming water-logged.

The details of the pump and air attachment are well known to those skilled in the art, so that a specific illustration and description need not be made herein. A pipe or water main 3 at one end connects with the discharge of the pump and at its opposite end with the compression tank 4. The water main 3 usually is formed of a number of pipe sections and elbow pipe fittings to conform to an upwardly extended loop between the pump and tank inlet especially when the pump and tank have the same base elevation. This, however, is but one common form for making a pump and tank connection for maintaining water-tight joints, accommodating for the contraction and expansion, and which is used merely as an example of a general installation, enabling a clearer understanding of the present invention. This form of connection presents a horizontal section of piping higher than the elevation of the tank inlet, in which air may pocket and accumulate. As air is compressible and elastic, it has been experienced that in time it will collect a quantity of air at such high points sufficient to materially interfere with the capacity of the main and impart a counter-pressure against the pump, reducing the efficiency of the pump.

As the pumps in an automatic system are usually driven by an electric or water motor under automatic control governed by a definite high and low degree of tank pressure, it will be readily recognized that a pump operating against such an abnormal condition, exerts a heavy starting load to the motor and may impose a load injurious to the motor.

The main 3 has a check valve 5 interposed therein, which, in the preferred construction shown, comprises a valve casing interiorly divided into an inlet chamber 6 and a discharge chamber 7, with a valve 8 for closing the port 9 connecting such chambers. A stem 10 projects from one side of the valve 8, carrying a piston 11 at its end sliding within the cylindrical extension 12 of the casing, providing a dash-pot for the retreat or closing stroke of the valve. The piston has a port 13 therethrough to provide a passage for the escape of the fluid in the chamber formed between the piston and plug 14, closing the cylindrical extension 12 of the casing. A piston 15, fixed to the opposite side of the valve 8, slides in the cylinder formed by the walls of the valve casing for retarding the opening movement of the valve. The cylinder for the piston 15 is sealed by a cap or plug 16 screw threaded into the casing. A spring 17 is interposed between the piston 15 and plug 16 for applying a closing pressure to the valve. The wall forming the cylinder for the piston 15 is provided with a port therethrough communicating with the chamber formed between said piston 15 and plug 16 and the outlet chamber 7. With the valve thus guided at its opposite sides, it is given more stability, and with its motion slightly retarded in either direction, it will not be abruptly opened and closed with the pump pulsations, so that its operation will be rendered noiseless.

In a system of this class any knocking or hammering of the valves is materially amplified and transmitted through the piping to various points where the fixtures are located, making the same very objectionable.

The chamber 6, at the pump side of the check valve 8, is arranged to provide a downward course for the flowing water before it passes through the valve port. This will cause the air delivered from the pump to be trapped at the upper portion of the chamber 6, and at which point the chamber is in direct communication with the compression tank through an upwardly extended pipe or tubing 19. The pipe 19 has a shut-off valve 20 and a check valve 21 interposed therein, preferably located at the inlet end thereof, and its opposite end connected with the compression tank through the base fitting 22 of the water level gage 23, and preferably extends slightly upward into the gage glass, so that the air can pass upward through the gage glass or tube and through the top gage fitting into the compression tank. Connecting the air conveying pipe 19 with the water level gage is of aid for observation purposes when the water in the tank is above the level of the end of the pipe 19, as the air can be observed passing upwardly in bubbles through the water in the gage tube, so that it can be readily determined whether any air is being delivered into the tank. The pipe 19 therefore provides a direct upward escape of all air delivered into the water main, and which will travel upwardly under its specific gravity if unobstructed in such course.

Having described my invention, I claim:

1. A water supply system, combining a compression tank for receiving and supplying water under pressure to the place of utilization, a combined water and air pump in service connection with said tank, and a pipe for air trapped in the system, connecting said pump in a constant ascending course with the tank whereby air trapped in the system flows into the compression tank.

2. A water supply system combining a compression tank for receiving and supplying water under pressure to the place of utilization, a pumping apparatus, a main pipe connecting said pumping apparatus and tank, and a branch pipe line connecting at one end with said pipe at a high elevation point thereof, and at its opposite end with said tank providing a constantly ascending air conveying passage between the pump and tank.

3. A water supply system, combining a compression tank for receiving and supplying water under pressure to the place of utilization, a pump connecting with said tank for supplying water thereto, a check valve interposed in the pump and tank connection, providing a chamber on the pump side of the valve, and a pipe connecting with said tank and said chamber for conveying air from said chamber into the tank.

4. A water supply system combining a compression tank having a glass water level gage disposed to gage a normal water level to be maintained in said tank, a pump in service connection with said tank below the water level gage, a check valve interposed between the pump and tank connection, having a chamber at the pump side of the valve, and a pipe connecting said chamber and tank through the water level gage.

5. In a device of the nature disclosed, a pump and a water service pressure tank, a water connecting conduit therefor, an independent means for conveying trapped air from said conduit and discharging it into the pressure tank, whereby the pump forces both water and air into the tank at different points, preventing air, opposing to the water flow, from accumulating in said conduit.

6. In a device of the nature disclosed, a pump and a water service pressure tank, a water connecting conduit therefor, a second conduit connecting said pump and tank in a constantly ascending course from the pump into the tank and having communication with the water connecting conduit, whereby the pump forces both water and air at different points into the tank, preventing air, opposing the water flow, from accumulating in said first-named conduit and permitting its passage through said second conduit.

7. A water supply system combining a compression tank for receiving and supplying water under pressure to the place of utilization, a pumping apparatus, a main pipe connecting said pumping apparatus and tank, and a branch pipe line communicating at one end with said pumping apparatus for conveying air trapped in said system, and at its opposite end connected with said tank, and providing a constantly ascending air conveying passage between the pump and tank.

8. In a device of the nature disclosed, a pump and a water service pressure tank, a water connecting conduit therefor, an independent means for conveying trapped air from said conduit and discharging it into the pressure tank, and a water check valve between said air conveying means and the tank, whereby the pump forces both water and air into the tank at different points, preventing air, opposing to the water flow, from accumulating in said conduit.

In witness whereof, I hereunto subscribe my name, as attested by the two subscribing witnesses.

J. HENRY VAILE.

Witnesses:
 Jos. Nann,
 R. L. Tansel.